(12) United States Patent
Bice et al.

(10) Patent No.: US 6,736,891 B1
(45) Date of Patent: May 18, 2004

(54) PROCESS FOR PRODUCING HYDROPHOBIC PARTICULATE INORGANIC OXIDES

(75) Inventors: Jo-Ann E. Bice, Murrysville, PA (US); Stuart D. Hellring, Pittsburgh, PA (US); Timothy A. Okel, Trafford, PA (US); James R. Hahn, Midland, MI (US)

(73) Assignees: PPG Industries Ohio, Inc., Cleveland, OH (US); Dow Corning Corporation, Midland, MI (US)

( * ) Notice: Subject to any disclaimer, the term of this patent is extended or adjusted under 35 U.S.C. 154(b) by 360 days.

(21) Appl. No.: 09/636,311

(22) Filed: Aug. 11, 2000

Related U.S. Application Data

(60) Provisional application No. 60/203,442, filed on May 10, 2000, provisional application No. 60/156,861, filed on Sep. 30, 1999, and provisional application No. 60/149,755, filed on Aug. 19, 1999.

(51) Int. Cl.$^7$ .................................................. C09C 1/28
(52) U.S. Cl. ............. 106/490; 106/287.11; 106/287.13; 106/287.14; 106/287.19; 106/287.1
(58) Field of Search ............................ 106/287.14, 490, 106/287.1, 287.11, 287.13, 287.19

(56) References Cited

U.S. PATENT DOCUMENTS

| | | | | |
|---|---|---|---|---|
| 5,009,874 A | | 4/1991 | Parmentier et al. | 423/335 |
| 5,226,930 A | * | 7/1993 | Sasaki | 50/308 |
| 5,705,137 A | | 1/1998 | Goerl et al. | 423/335 |
| 5,739,197 A | | 4/1998 | Swift et al. | 524/492 |
| 5,763,388 A | | 6/1998 | Lightsey et al. | 523/212 |
| 5,852,099 A | | 12/1998 | Vanel | 524/494 |
| 5,859,117 A | | 1/1999 | Goerl et al. | 524/493 |
| 5,888,467 A | | 3/1999 | Swift et al. | 423/335 |
| 5,908,660 A | | 6/1999 | Griffith et al. | 427/220 |
| 5,919,298 A | | 7/1999 | Griffith et al. | 106/490 |
| 5,985,953 A | | 11/1999 | Lightsey et al. | 523/212 |
| 6,051,672 A | | 4/2000 | Burns et al. | 528/10 |
| 6,342,560 B1 | * | 1/2002 | Okel | 524/493 |

FOREIGN PATENT DOCUMENTS

| | | |
|---|---|---|
| DE | 3525802 A1 | 1/1987 |
| EP | 721 971 A1 | 7/1996 |
| EP | 795 579 A1 | 9/1997 |
| EP | 849 320 A1 | 6/1998 |
| EP | 890 600 A1 | 1/1999 |
| EP | 0900829 | 3/1999 |
| EP | 0927748 | 7/1999 |
| EP | 0928818 | 7/1999 |
| EP | 931 812 A1 | 7/1999 |
| EP | 959 102 A2 | 11/1999 |
| GB | 2001303 | 1/1979 |
| JP | 8-176462 A | 7/1996 |
| JP | 10-316406 A | 12/1998 |
| WO | WO 99/36356 | 7/1999 |

OTHER PUBLICATIONS

J. W. Lightsey et al, DSM Copolymer, Inc., "Silica Wet Masterbatch: A New Process for Pre–Dispersion of Silica in Emulsion Polymers", ACS Meeting, (Oct. 1997).
A. Krysztafkiewicz, "Modified Silica precipitated in the medium of organic solvents—an active rubber filler", Colloid & Polymer Science, vol. 267, pp 399–408 (1989), no month provided.

* cited by examiner

*Primary Examiner*—David Brunsman
(74) *Attorney, Agent, or Firm*—Frank P. Mallak; Carol A. Marmo

(57) ABSTRACT

Described is an improved process for producing hydrophobic particulate inorganic oxides useful for reinforcing polymeric compositions, e.g., rubber, by using a certain amount of hydrophobizing agents in an aqueous suspension of inorganic oxide having a pH of 2.5 or less and increasing the pH of the suspension after hydrophobizing the filler.

17 Claims, No Drawings

PROCESS FOR PRODUCING HYDROPHOBIC PARTICULATE INORGANIC OXIDES

CROSS REFERENCE TO RELATED APPLICATIONS

This application claims the benefit of U.S. provisional applications Serial No. 60/203,442, filed May 10, 2000, Ser. No. 60/156,861, filed Sep. 30, 1999 and Ser. No. 60/149,755, filed Aug. 19, 1999.

Particulate inorganic oxides, such as precipitated silica, are finding increasing use as reinforcing fillers in cured rubber compositions, especially tire treads. Reinforcement of rubber compositions is necessary in order to provide acceptable mechanical properties to the cured rubber compositions.

A problem associated with the use of particulate inorganic oxides in cured rubber compositions is their rather low degree of dispersion in the cured rubber, as evidenced by the relatively large percentage of white area in an optical microscope field. Grinding or milling the inorganic oxide before use in forming the cured rubber composition may produce better dispersions and hence exhibit less white area in the optical microscope field, but once the bulk of the improvement has been achieved, continued grinding or milling, even for prolonged periods, does not result in much further improvement in the degree of dispersion.

U.S. Pat. No. 5,908,660 discloses hydrophobic amorphous precipitated silica as a reinforcing and extending filler in natural rubbers and in silicone rubbers. The '660 patent describes: (1) preparing hydrophobic particulate amorphous precipitated silica from hydrophilic amorphous precipitated silica by a "pop-out" process wherein an aqueous suspension of hydrophilic particulate amorphous precipitated silica is contacted with a catalytic amount of an acid and an organosilicon compound to form an aqueous suspension of hydrophobic particulate amorphous precipitated silica, and then the aqueous suspension of hydrophobic particulate amorphous precipitated silica is contacted with water-immiscible organic solvent to transfer the hydrophobic particulate amorphous precipitated silica from the liquid aqueous phase to the liquid organic phase; (2) that the amount of organosilicon compound added to the aqueous phase should be sufficient to produce a hydrophobic particulate amorphous precipitated silica suitable for its intended use; (3) that generally the organosilicon compound should be added in an amount such that there is at least 0.04 organosilyl unit per $SiO_2$ unit in the precipitated silica; and (4) that the upper limit of the amount of organosilicon compound added is not critical since any amount in excess of the amount required to completely hydrophobize the precipitated silica will act as a solvent. U.S. Pat. No. 5,908,660 discloses a very broad range of hydrophobization, ranging from a small degree of hydrophobization to complete hydrophobization.

Published European Patent Application EP 0 849 320 A1 discloses amorphous precipitated silica having clusters of coupling agent chemically bonded to its surface. The coupling agent optionally also has a functional group having the capability of reacting with a rubbery thermoplastic polymer during the cure or compounding thereof to chemically bind the coupling agent to the polymer.

U.S. Pat. Nos. 5,739,197 and 5,888,467 disclose a particulate amorphous precipitated silica characterized by a Standard White Area, as therein defined, of 0.42 percent. U.S. Pat. No. 5,852,099 discloses particulate alumina as a reinforcing filler in organic rubbers.

European Patent application 721,971 A1 and Japanese Provisional Publication No. 8-176462, respectively, describe a pneumatic tire tread made from a rubber composition containing a partially hydrophobized silica and a partially hydrophobized precipitated silicic acid in which the level of hydrophobization, as measured by di-n-butylamine, is 70–180 mmol/kg.

Hydrophobic particulate inorganic oxide has now been discovered which is capable of providing an unexpectedly high degree of dispersibility in cured rubber compositions. Inasmuch as an unexpectedly high degree of dispersibility is not disclosed in the aforedescribed documents, the present invention represents a solution to the above-described dispersion problem and to be an advance in this art. The high degree of dispersibility of the hydrophobic particulate inorganic oxides of the present invention can be characterized by the M1 Standard White Area, which is hereinafter described in detail.

Hydrophobic particulate inorganic oxide used in the compositions of the present invention include the reaction product of (1) hydrophilic inorganic oxide selected from the group consisting of particulate or amorphous precipitated silica, colloidal silica, and mixtures thereof, and (2) at least one organometallic reactant selected from the group consisting of first organometallic compound represented by the formula:

$$R^1_a MX_{4-a}$$

second organometallic compound represented by the formula:

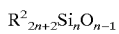

$$R^2_{2n+2} Si_n O_{n-1}$$

third organometallic compound represented by the formula:

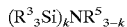

$$(R^3_3 Si)_k NR^5_{3-k}$$

fourth organometallic compound represented by the formula:

$$R^4_{2m} Si_m O_m$$

and mixtures thereof wherein: (a) each M is independently silicon, titanium or zirconium; (b) each $R^1$ is independently a hydrocarbon group having no ethylenic unsaturation (e.g., a saturated aliphatic, cycloaliphatic or aromatically unsaturated hydrocarbon group) which contains from 1 to 18 carbon atoms; (c) each X is independently halo, amino, alkoxy containing from 1 to 12 carbon atoms, or acyloxy containing from 1 to 12 carbon atoms; (d) a is 1, 2, or 3; (e) each $R^2$ is independently halo, hydroxy, or a hydrocarbon group having no ethylenic unsaturation (as described for $R^1$), which contains from 1 to 18 carbon atoms, with the proviso that at least 50 mole percent of the $R^2$ substituents are the hydrocarbon groups having no ethylenic unsaturation; (f) n is from 2 to 10,000; (g) each $R^3$ is independently halo, hydroxy, or a hydrocarbon group having no ethylenic unsaturation (as described for $R^1$), which contains from 1 to 18 carbon atoms, with the proviso that at least 50 mole percent of the $R^3$ substituents are the hydrocarbon groups having no ethylenic unsaturation; (h) each $R^5$ is independently hydrogen or a hydrocarbon group having no ethylenic unsaturation (as described for $R^1$), which contains from 1 to 18 carbon atoms; (i) k is 1 or 2; (j) each $R^4$ is independently a hydrocarbon group having no ethylenic unsaturation (as described for $R^1$), which contains from 1 to 18 carbon atoms; and (k) m is a number from 3 to 20; wherein the hydrophobic particulate inorganic oxide is characterized by an M1 Standard White Area of less than 0.4 percent.

The hydrophobic particulate inorganic oxide of the present invention is also characterized by a methanol wettability of from 15 to 45 percent, preferably from 20 to 40 percent and more preferably from 25 to 35 or the methanol wettability may range between any combination of these values, inclusive of the recited values. The hydrophobic particulate inorganic oxide of the present invention is further characterized by a pH of from 3 to 10, preferably, from 4 to 8, more preferably from 5 to 7.5, and most preferably from 6 to 7, or the product pH may range between any combination of these values inclusive of the recited ranges, e.g., a pH of from 3 to 7.5.

As used herein with respect to the aforedescribed organometallic compounds, the term halo includes fluoro, chloro, bromo and iodo, preferably chloro. By "no unsaturation" is meant substantially no ethylenic unsaturation since the source of or preparative methods for some hydrocarbon groups may result in the presence of small amounts of ethylenic unsaturation in the hydrocarbon group.

For purposes of the present invention, when the organometallic reactant is an organosilicon reactant, the silicon is considered to be a metal.

The hydrophilic particulate precipitated silicas which may be used in producing the hydrophobic precipitated silicas of the invention are known and are commercially available. Processes for producing hydrophilic particulate amorphous precipitated silicas and the properties of the products are described in detail in U.S. Pat. Nos. 2,657,149; 2,940,830; 4,132,806; 4,495,167, 4,681,750, and 5,094,829.

Hydrophilic particulate or amorphous precipitated silicas are usually produced commercially by combining an aqueous solution of a soluble metal silicate, ordinarily alkali metal silicate such as sodium silicate, and an acid so that colloidal particles will grow in a weakly alkaline solution and be coagulated by the alkali metal ions of the resulting soluble alkali metal salt. Various acids may be used, including the mineral acids, such as sulfuric acid and hydrochloric acid. Carbonic acid, e.g., carbon dioxide charged to the aqueous solution of soluble metal silicate, may also be used. In the absence of a coagulant, silica is not precipitated from solution at any pH. The coagulant used to effect precipitation may be the soluble alkali metal salt produced during formation of the colloidal silica particles, an added electrolyte, such as a soluble inorganic or organic salt, or a combination of both added salts and the salts formed in situ during the precipitation.

Amorphous precipitated silica may be described as precipitated aggregates of ultimate particles of colloidal amorphous silica, which aggregates have not at any point existed as a macroscopic gel during their preparation. The sizes of the aggregates and the degrees of hydration may vary widely.

Referring to the organometallic compound, each $R^1$ and each $R^4$ can independently be a hydrocarbon group having no ethylenic unsaturation and which contains from 1 to 18 carbon atoms, e.g., a $C_1$–$C_{18}$ alkyl group. Often, each $R^1$ and each $R^4$ independently contains from 1 to 12 carbon atoms, frequently, from 1 to 10 carbon atoms, particularly from 1 to 8 carbon atoms, more particularly from 1 to 6 carbon atoms. In many cases, each $R^1$ and each $R^4$ independently contains from 1 to 4 carbon atoms. Preferably, each $R^1$ and each $R^4$ are independently methyl or ethyl.

Each $R^1$ and each $R^4$ can independently be a saturated or aromatically unsaturated monovalent hydrocarbon group containing from 1 to 18 carbon atoms. Each $R^1$ and each $R^4$ can independently be a substituted or unsubstituted monovalent hydrocarbon group having no ethylenic unsaturation. Examples of suitable hydrocarbon groups having no ethylenic unsaturation include alkyl groups such as methyl, ethyl, propyl, isopropyl, butyl, isobutyl, sec-butyl, tert-butyl, hexyl, heptyl, octyl, decyl, dodecyl, hexadecyl and octadecyl; substituted alkyl groups include haloalkyl groups such as chloromethyl, 3,3,3-trifluoropropyl, and 6-chlorohexyl; cycloalkyl groups include groups such as cyclohexyl and cyclooctyl; aryl groups include phenyl and naphthyl; and alkylaryl, e.g., $C_1$–$C_4$ alkylaryl, and aralkyl, e.g., aryl ($C_1$–$C_4$)alkyl, groups include groups such as tolyl, ethylphenyl, benzyl and alkyl-substituted naphthyl, e.g., $C_1$–$C_4$ alkyl substituted naphthyl.

Each X is independently selected from the group consisting of halo, amino, alkoxy groups containing from 1 to 12 carbon atoms, preferably 1 to 4 carbon atoms and acyloxy groups containing from 1 to 12 carbon atoms. When X is halo, it is preferred that it be chloro. When X is an alkoxy group, X may preferably be, for example, methoxy, ethoxy, or propoxy. Preferably, each X is independently chloro or methoxy. When X is acyloxy, it is often acetoxy.

Each $R^2$ is independently selected from the group consisting of halo, hydroxy, and a hydrocarbon group having no ethylenic unsaturation and containing from 1 to 18 carbon atoms, with the proviso that at least 50 mole percent of the $R^2$ substituents are the hydrocarbon groups having no ethylenic unsaturation. $R^2$ can be the same as $R^1$ and/or $R^4$ as described above. The viscosities of such organosiloxanes are not limiting and can range from that of a fluid to that of a gum. Generally, higher molecular weight organosiloxanes will be cleaved by the acidic conditions at which the hydrophobic particulate amorphous precipitated silica is prepared, thereby allowing them to react with the hydrophilic inorganic oxide.

Each $R^3$ is independently selected from the group consisting of chloro, hydroxy, and hydrocarbon groups having no ethylenic unsaturation and containing from 1 to 18 carbon atoms, with the proviso that at least 50 mole percent of the $R^3$ substituents are said hydrocarbon groups. When an $R^3$ is a hydrocarbon group, it can be the same as or different from the hydrocarbon groups described for $R^1$. Preferably $R^3$ is methyl or ethyl.

Each $R^5$ is independently selected from the group consisting of hydrogen and hydrocarbon groups having no ethylenic unsaturation and containing from 1 to 18, preferably 1 to 8, more preferably 1 to 4, carbon atoms. Preferably $R^5$ is hydrogen, methyl or ethyl.

The value of m can vary from 3 to 20. Often the value of m is from 3 to 8, particularly from 3 to 7, and preferably m is 3 or 4.

Examples of useful organosilicon compounds that may be used as the organometallic compound, include, but are not limited to, methyltrichlorosilane, dimethyldichlorosilane, trimethylchlorosilane, diethyldichlorosilane, methylphenyldichlorosilane, phenylethyldiethoxysilane, 3,3,3-trifluoropropylmethyldichlorosilane, trimethylbutoxysilane, pentylmethyldichlorosilane, hexamethyldisiloxane, hexaethyldisiloxane, sym-diphenyltetramethyldisiloxane, octamethyltrisiloxane, hexamethylcyclotrisiloxane, hexamethyldisilazane, siloxanes comprising from 3 to 20 dimethylsiloxy units, and trimethylsiloxy or hydroxydimethylsiloxy endblocked poly (dimethylsiloxane) polymers having an apparent viscosity within a range of from 1 to 1,000 mPa·s at 25° C. The preferred organosilicon compounds are trimethylchlorosilane, dimethyldichlorosilane, and hexamethyldisiloxane.

Examples of organotitanium compounds that may be used include, but are not limited to, tetra($C_1$–$C_{18}$)alkoxy titanates, methyl triethoxy titanium (iv), methyl titanium (iv) triisopropoxide, methyl titanium (iv) tributoxide, methyl titanium (iv) tri-t-butoxide, isopropyl titanium (iv) tributoxide, butyl titanium (iv) triethoxide, butyl titanium (iv) tributoxide, phenyl titanium (iv) triisopropoxide, phenyl titanium (iv) tributoxide, phenyl titanium (iv) triisobutoxide, [Ti($CH_2$Ph)$_3$($NC_5H_{10}$)] and [Ti($CH_2$SiMe$_3$)$_2$($NEt_2$)$_2$].

Examples of useful organozirconium compounds that may be used include, but are not limited to, tetra($C_1$–$C_{18}$) alkoxy zirconates, phenyl zirconium (iv) trichloride, methyl zirconium (iv) trichloride, ethyl zirconium (iv) trichloride, propyl zirconium (iv) trichloride, methyl zirconium (iv) tribromide, ethyl zirconium (iv) tribromide, propyl zirconium (iv) tribromide, chlorotripentyl zirconium (iv). Zirconium compounds similar to those described above for the organotitanium compounds and vice-versa are also contemplated.

The hydrophobic particulate inorganic oxide of the present invention is characterized by an M1 Standard White Area of less than 0.4 percent., e.g., less than 0.35 percent. Often, the M1 Standard White Area is less than 0.3 percent, e.g., less than 0.25 percent. Frequently, the M1 Standard White Area is less than 0.2 percent, preferably, less than 0.1 percent. The relatively low values obtained for the M1 Standard White Area of the hydrophobic particulate inorganic oxide of the present invention represents the unexpectedly high degree of dispersability of the material in cured rubber compositions.

The M1 Standard White Area is determined using the standard protocol and standard cured organic rubber formulation described in detail hereinafter. Since both the protocol and the formulation are standardized, the M1 Standard White Area is properly taken as a characteristic of the hydrophobic particulate inorganic oxide. The standard protocol for determination of M1 standard White Area according to the present invention differs from the standard protocol for determination of Standard White Area according to the disclosures of U.S. Pat. No. 5,739,197 and U.S. Pat. No. 5,888,467. The principal differences are (1) that the standard cured rubber compound is prepared from two polymer masterbatches, each recovered from a water-immiscible solvent containing one of the two standard polymers, the hydrophobic inorganic oxide and the aromatic process oil; (2) that the mix cycle has been shortened to two passes, each of shorter duration; and (3) that the mixer employed is a C.W. Brabender Prep Mixer® rather than a Kobelco Stewart Bolling Model "00" internal mixer.

Accordingly, a further embodiment of the present invention is hydrophobic particulate inorganic oxide which is the reaction product of hydrophilic inorganic oxide selected from the group consisting of the particulate or amorphous precipitated silica, colloidal silica, and a mixture thereof, and at least one organometallic reactant selected from the group consisting of the aforedescribed first organometallic compound, second organometallic compound, third organometallic compound, fourth organometallic compound and mixtures thereof, wherein the hydrophobic particulate inorganic oxide is characterized by: (a) the substantial absence of functional groups capable of chemically reacting with rubber; (b) a hydroxyl content in the range of from 2 to 15 OH/$nm^2$; and (c) an M1 Standard White Area less than 0.4 percent. The hydroxyl content of the hydrophobic particulate inorganic oxide of this embodiment of the present invention is frequently in the range of 3 to 14 OH/$nm^2$; preferably in the range of 4 to 12 OH/$nm^2$.

The hydrophobic particulate inorganic oxide of the present invention can also be characterized by a methanol wettability of at least 15 percent, preferably 20 percent, and more preferably 25 percent. Generally, the methanol wettability is less than 45 percent, preferably less than 40 percent, and more preferably less than 35 percent. The methanol wettability can range between any combination of the foregoing values, inclusive of the recited range.

The methanol wettability value is the concentration of methanol (in weight percent) required to wet 50 percent of the hydrophobic inorganic oxide, i.e., the amount of methanol needed to produce 50 percent wetting (50 percent suspended and 50 percent in the sediment).

The methanol wettability value is determined by first determining the amount of hydrophobic inorganic oxide wetted with 50 weight percent methanol. This is done by adding 2.0 grams of a sample to a 50 milliliter (mL) conical centrifuge tube containing 15 mL of a 50 weight percent mixture of methanol (HPLC grade) and deionized water. A centrifuge tube that is graduated in 0.5 mL marks up to the 10 mL level and in 1.0 mL marks from the 10 to 50 mL levels is used. The contents of the tube are shaken for 15 seconds and centrifuged at approximately 4,000 revolutions per minute (rpm) in a hanging bucket type centrifuge at room temperature (23–25° C.) for 15 minutes. The centrifuge tube is removed and handled carefully to avoid resuspending the sediment. The amount of hydrophobic inorganic oxide that is wetted, i.e., formed the sediment, is recorded to the nearest 0.5 mL.

Afterwards, a series of at least 3 different concentrations of the methanol/water mixture are tested. This is done to determine the concentration of methanol that would cause 50 and 100 percent wetting of the hydrophobic inorganic oxide. Preferably the concentrations selected include at least one concentration above and at least one below the amount necessary to cause 50 percent of the hydrophobic inorganic oxide to be wetted. The concentrations selected may range from 5 to 95 weight percent methanol, in 5 weight percent increments, depending on the amount wetted by 50 weight percent aqueous methanol. For example, if all of the hydrophobic inorganic oxide is wetted with 50 weight percent methanol, concentrations of methanol ranging from 5 to 45 percent would be tested.

The percent of hydrophobic inorganic oxide wetted by the different concentrations of methanol was calculated by dividing the volume of the partially wetted hydrophobic inorganic oxide by the volume of the completely wetted hydrophobic inorganic oxide and multiplying by 100. The results were plotted on a graph of Percent Wetted versus Concentration of Methanol and fitted with a straight line. The concentration of methanol at which 50 percent of the hydrophobic inorganic oxide was wetted was determined from the line equation.

As used in the present specification and claims the silanol content of hydrophobic particulate or amorphous precipitated silica is determined according to one of the two following methods. When the carbon to silicon mole ratio of the organosilane used for the hydrophobizing treatment is known, and when no silanols result from the organosilane, the method described by A. Tuel et al, *Langmuir*, vol. 6, pages 770–775 (1990) is used. This method combines [29]Si-nmr data for a sample of the hydrophobic amorphous precipitated silica with carbon content from elemental analysis of the sample to calculate unreacted silanol content. When the carbon to silicon mole ratio of the organosilane used for the hydrophobizing treatment is not known or poorly defined, a deuterium-exchange method is to be used as described by G. Foti et al, *Langmuir*, vol. 5, pages 232–239 (1989). These two methods are known to provide nearly identical values for silanol content of samples for which both methods are applicable.

The carbon content of the hydrophobic particulate inorganic oxide of this embodiment of the present invention is in the range of from 0.1 to 6 percent by weight, e.g., from 0.2 to 5 percent by weight. A carbon content in the range of from 0.3 to 3 or 4 percent by weight is preferred. As used in the present specification and claims, the carbon content of the hydrophobic particulate inorganic oxide is determined by a technique that is based on a modification of the classical Pregal and Dumas method. The samples (1 to 2 milligrams) are sealed in a lightweight tin capsule, and introduced into a vertical quartz tube, maintained at 1040° C., through which is passed a constant flow of helium. After the samples have been introduced, the flow of helium is enriched with oxygen and flash combustion is allowed to occur, primed by oxidation of the tin capsule. The gas mixture is passed over chromium oxide ($Cr_2O_3$) to achieve quantitative combustion. The combustion gases are then passed over copper at 650° C. to remove excess oxygen and reduce the oxides of nitrogen to nitrogen. Then the gases are passed through a chromatographic column of Porpak QS at 100° C. The individual components are then separated and eluted as $N_2$, $CO_2$, and $H_2O$. The instrument is calibrated by combustion of standard compounds.

The carbon content of the hydrophobic inorganic oxide of the present invention is substantially non-extractable, i.e., at least 80 percent, preferably at least 85 percent, more preferably at least 90 percent, and most preferably at least 93 percent of the carbon on the inorganic oxide remains with the inorganic oxide after the extraction procedure. The extractability of the carbon content of the hydrophobic inorganic oxide can be measured by the following method.

The percent carbon of a portion of the hydrophobic particulate inorganic oxide is determined using the procedure described herein, before performing the extraction. The extraction is conducted by adding 5 to 15 grams of the hydrophobic particulate inorganic oxide to a 43 mm×123 mm (internal diameter×external length) cellulose extraction thimble which is placed into an appropriately sized Soxhlet extraction tube and fitted with a condenser. This Soxhlet extractor and condenser system is attached to a round bottom flask containing 700 mL of toluene. The flask is heated to the reflux temperature of the toluene. After refluxing for a minimum of 15 hours, the used toluene is replace with 700 mL of unused toluene and refluxing is continued for a minimum of another 15 hours. The resulting extracted inorganic oxide is recovered and dried until a sample shows about 1.0 weight percent loss or less when exposed to 160° C. for 10 minutes. The percent carbon of the extracted sample is determined. The percent of carbon that is Soxhlet extractable is determined using the following equation:

$$\frac{(\% \text{ carbon before extraction}) - (\% \text{ carbon after extraction})}{(\% \text{ carbon before extraction})} \times 100$$

The hydrophobic particulate inorganic oxide of the various embodiments of the present invention should preferably be substantially free of functional groups capable of chemically reacting with rubber at least prior to contacting the hydrophobic particulate inorganic oxide with rubber either during the mixing of the rubber compound composition or in a solution of one or more rubbers in a water-immiscible solvent. Inconsequential amounts of functional groups capable of a chemical reaction with rubber but having no substantive effect may be present, but the total absence of such groups is preferred.

The BET surface area of the hydrophobic particulate inorganic oxides of the various embodiments of the present invention is usually, but not necessarily, in the range of from 40 to 350 $m^2/g$, preferably from 60 to 200 $m^2/g$, and more preferably from 80 to 160 $m^2/g$. As used in the present specification and claims, the BET surface area of the hydrophobic particulate inorganic oxide is the surface area determined by the Brunauer, Emmett, Teller (BET) method according to ASTM D 1993-91 using nitrogen as the adsorbate but modified by outgassing the system and the sample for one hour at ambient room temperature.

The BET surface area of the hydrophilic particulate inorganic oxide before treatment to render the inorganic oxide hydrophobic is the surface area determined by the Brunauer, Emmett, Teller (BET) method according to ASTM D 1993-91 using nitrogen as the adsorbate but modified by outgassing the system and the sample for one hour at 165° C. The BET surface area of the hydrophilic particulate inorganic oxide used in the present method is not critical and can generally be within a range of 50 $m^2/g$ to greater than 400 $m^2/g$. However, a preferred inorganic oxide for use in the present method, particularly when the inorganic oxide is to be used as a reinforcing filler in organic rubber compositions, is within a range of 100 to 250 $m^2/g$, e.g., 100 to 200 $m^2/g$.

The pH of the hydrophobic particulate inorganic oxide of the various embodiments of the present invention is usually, but not necessarily, in the range of from 3 to 10. As used in the present specification and claims, the pH of hydrophobic particulate inorganic oxide is determined by the following procedure: 5.0 grams of the particulate inorganic oxide (in powder form), 50 milliliters of isopropanol, and 50 milliliters of deionized water are added to a 150-milliliter beaker containing a magnetic stir bar. The contents of the beaker are stirred vigorously (without splashing) until the inorganic oxide is suspended. A calibrated pH electrode is placed in the vigorously stirring suspension and the pH reading is recorded after one minute (±5 seconds).

In practice, the hydrophobic particulate inorganic oxide representing embodiments of the present invention and a coupling agent(s), which is not covalently bonded to the inorganic oxide, can be present in a rubber (elastomer) composition prior to its being cured, or in a solution of a rubber (or blend of rubbers) in water-immiscible solvent prior to recovery and drying of a rubber masterbatch. Consequently, the hydrophobic particulate inorganic oxide of this invention may be used as a carrier for a coupling agent(s) that is not covalently bonded with the inorganic oxide. Coupling agent(s) that are covalently bonded to the hydrophobic particulate inorganic oxide may be present in the final cured rubber. Coupling agents for inorganic oxides such as silica before covalent bonding are many and well known. Nonlimiting examples of such coupling agents include:

mercaptopropyltrimethoxysilane,
mercaptopropyltriethoxysilane,
bis(3-(trimethoxysilyl)propyl)tetrasulfide,
bis(3-(triethoxysilyl)propyl)tetrasulfide,
bis(3-(trimethoxysilyl)propyl)disulfide,
bis(3-(triethoxysilyl)propyl)disulfide,
3-trialkoxysilylpropylthiocyanate,
and trialkoxyvinylsilane.

The hydrophobic particulate inorganic oxides of any of the embodiments of the present invention may be substantially dry or they may be dispersed in a slurry. The liquid of the slurry can be aqueous, in which case it may be neat or it may contain one or more water-miscible organic liquids. The liquid of the slurry can alternatively be organic, in which case it may be a single organic liquid which may be water-miscible or water-immiscible, or it may be a mixture of organic liquids. Dissolved solids may or may not be present as desired.

The gross particles of the hydrophobic particulate inorganic oxide of any of the embodiments of the present invention may be in many forms, as for example, granules, beads, tablets, cylinders, flakes, or powder. When in the form of a powder, the median particle size is usually in the range of from 5 to 70 μm. Often the median particle size of the powder is in the range of from 15 to 50 μm, e.g., from 25 to 40 μm. When in the form of beads, the median particle size is usually in the range of from 80 to 350 μm. In a further embodiment, the median particle size of the beads is in the range of from 150 to 350 μm, e.g., from 250 to 325 μm.

Particle size determination of powder, beads, or other shapes having similar sizes is accomplished by laser diffraction techniques.

When in the form of granules, tablets, cylinders, flakes, or other similar shapes, particle size determination is accomplished by screening and sizes are reported in terms of standard sieve designations of the US Standard Sieve Series according to ASTM E 11-87. In most cases the particles have sizes predominantly in the range of from 1 to 15 mm. Often the particles have sizes in the range of from 1 to 10 mm, e.g., from 2 to 7 mm. It is preferred that particles be substantially dust free, i.e., at least 99 percent by weight is retained by a 200 mesh screen (U.S. Sieve Series). The gross particles of the hydrophobic particulate inorganic oxide of any of the embodiments of the present invention are preferably granulate, such as is produced by the process and apparatus of U.S. Pat. No. 4,807,819. When substantially dry particles are mixed with an uncured rubber composition, the gross sizes are usually substantially reduced as compared with the particles before mixing.

Hydrophobic particulate inorganic oxide of any of the embodiments of the present invention may be used as a slurry in aqueous and/or organic liquid, as described above. If a powder is used to produce the slurry, the median particle size is as described for powder. The slurry can be wet-milled to further reduce the particle size of the inorganic oxide. The mean particle size of a hydrophobic particulate inorganic oxide can be reduced to below 5 μm by wet milling. Preferably, the mean particle size of a wet milled hydrophobic particulate inorganic oxide is less than 2 μm.

The hydrophobic particulate inorganic oxide of the present invention may be produced by any method that results in a hydrophobic particulate inorganic oxide characterized by a substantial absence of functional groups capable of chemically reacting with rubber, a hydroxyl content of from 2 to 15 $OH/nm^2$ a carbon content of from 0.1 to 6 weight percent, a methanol wettability of from 15 to 45 percent and an M1 Standard White Area of less than 0.4 percent. The hydrophobic inorganic oxide of the present invention may also be characterized by a carbon content that is substantially non-extractable; a pH of from 3 to 10, and a BET Surface Area of from 40 to 350 $m^2/g$.

The hydrophobic particulate inorganic oxide of the present invention may be prepared by using step A alone or both steps A and B for preparing hydrophobic silica and fumed silica disclosed in U.S. Pat. Nos. 5,908,660 and 5,919,298, respectively, which disclosures are incorporated herein by reference, with the following changes. The amount of acid used results in a pH of 2.5 or less in the aqueous suspension, preferably, a pH of 2.0 or less, and more preferably, a pH of 1.0 or less and most preferably a pH of 0.5 or less; the amount of organometallic compound(s) used to hydrophobize the inorganic oxide results in a hydrophobic inorganic oxide having a hydroxyl content of from 2–15 $OH/nm^2$, a carbon content of from 0.1 to 6 weight percent and a methanol wettability of from 15 to 45 percent; and after the hydrophobizing reaction is completed, the acidity (either added or generated in situ by the hydrolysis of halogenated organometallic compounds) is neutralized to produce a hydrophobic inorganic oxide having a pH of from 3 to 10, a carbon content that is substantially non-extractable and an M1 Standard White Area of less than 0.4 percent.

Typically, when recovering the hydrophobic inorganic oxide after step A alone, the pH of the resulting aqueous suspension is increased to 3 or higher, preferably, 4 or higher, more preferably, 5 or higher and most preferably, 6 or higher and usually 10 or less, preferably 9 or less, more preferably 8 or less and most preferably 7 or less. The pH of the aqueous suspension may range between any combination of these levels, including the recited levels. The neutralizing agents can be of any type typically used to increase the pH of an acidic solution as long as the properties of the modified filler are not adversely effected. Suitable neutralizing agents include sodium hydroxide, potassium hydroxide, ammonium hydroxide and sodium bicarbonate. Neutralization of the modified filler may also be accomplished by adding gaseous ammonia to the aqueous solution during spray drying. When step B is used to recover the hydrophobic inorganic oxide in a water immiscible solvent, the pH of the hydrophobic inorganic oxide may be increased to a pH of 3.0 or more by washing with dilute aqueous neutralizing agents until the pH of the wash water is 3.0 or higher.

More particularly the process comprises: (A) contacting an aqueous suspension of hydrophilic particulate inorganic oxide with an amount of an acid that results in a pH of 2.5 or less and at least one organometallic reactant selected from the group consisting of the aforedescribed first organometallic compound, second organometallic compound, third organometallic compound, fourth organometallic compound and mixtures thereof; (B) then contacting the aqueous suspension of hydrophobic particulate inorganic oxide with water-immiscible organic solvent to transfer the suspended hydrophobic particulate inorganic oxide from the liquid aqueous phase to the liquid organic phase. The water-immiscible organic solvent which is used to contact the aqueous suspension of hydrophobic particulate inorganic oxide may or may not contain one or more materials dissolved therein, as is desired. Examples of such materials include, but are not limited to, one or more rubbers, oil, coupling agent, antioxidant, and accelerator.

The particulate inorganic oxide is present as an aqueous suspension during step (A). The concentration of particulate inorganic oxide in the aqueous suspension of step (A) is not critical and is ordinarily within a range of from 1 to 90 weight percent, although somewhat higher or lower concentrations can be employed. Often the concentration of particulate inorganic oxide in the aqueous suspension is within a range of from 10 to 50 weight percent, preferably within a range of 10 to 30 weight percent. The aqueous suspension can be milled, e.g., wet milled, prior to treatment with acid and the organometallic reactant to further enhance the dispersion (suspension) of the inorganic oxide in the aqueous medium and/or to reduce the particle size of the inorganic oxide particulates in the suspension.

In step (A) of the aforedescribed method, the aqueous suspension of particulate inorganic oxide is contacted with one or more of the organometallic reactants described above in the presence of an amount of acid that produces a pH of 2.5 or less in the aqueous suspension. The acid catalyst used in step (A) may be of many types, organic and/or inorganic. The preferred acid catalyst is inorganic. Examples of suitable acid catalysts include hydrochloric acid, hydrobromic acid, hydroiodic acid, sulfuric acid, nitric acid, phosphoric acid, and benzenesulfonic acid. One acid catalyst or a mixture of two or more acid catalysts may be employed as desired. When the organometallic reactant is, for example, a chlorosilane, the necessary amount of the acid may be generated in situ by hydrolysis of the chlorosilane or the reaction of the chlorosilane directly with hydroxyls of the inorganic oxide. In step (A), it is necessary that the acid be present in an amount sufficient to reduce the pH to 2.5 or less and effect reaction of the organometallic reactant with the particulate inorganic oxide. In step (A) it is preferred that a sufficient amount of the acid catalyst be used so as to provide a pH of the aqueous suspension of 2.0 or less, more preferably a pH of 1.0 or less, and most preferably a pH of 0.5 or less.

The temperature at which step (A) is conducted is not critical and is usually within the range of from 20° C. to 250° C., although somewhat lesser or somewhat greater temperatures may be used when desired. The reaction temperature will depend on the reactants used, e.g., the organometallic compound, the acid and, if used, a co-solvent. Preferably, step (A) is conducted at temperatures in the range of from 30° C. to 150° C., although Step (A) can be conducted at the reflux temperature of the slurry used in step (A) when this is desired.

While conducting step (A), the presence of surfactant and/or water-miscible co-solvent may be desirable to facilitate the reaction of the organometallic reactant with the particulate inorganic oxide. Suitable surfactants include, for example, anionic surfactants such as dodecylbenzene sulfonic acid, nonionic surfactants such as polyoxyethylene(23) lauryl ether, and $((CH_3)_3SiO)_2CH_3Si(CH_2)_3(OCH_2CH_2)_7OCH_3$, and cationic surfactants such as N-alkyltrimethylammonium chloride. One surfactant or a mixture of two or more surfactants may be used. Examples of suitable water-miscible organic co-solvents include tetrahydrofuran and alkanols containing from 1 to 4 carbon atoms; namely methanol, ethanol, propanol, isopropanol, butanol, isobutanol, sec-butanol, and tert-butanol. One water-miscible organic co-solvent or a mixture of two or more water-miscible organic co-solvents may be employed as desired.

The amount of organometallic reactant employed in step (A) is that amount which is sufficient to produce hydrophobic inorganic oxide of the type described herein and which provides the desired benefit. This hydrophobic inorganic oxide must maintain a stable dispersion in rubber cement, and remain dispersed in the wet rubber masterbatch crumb after solvent removal. If the amount of organometallic reactant is insufficient, the inorganic oxide will separate out from the rubber and into the water phase during solvent stripping. Hydrophobicity is related to the hydrocarbon content of the hydrophobic particulate inorganic oxide, and the hydrogen to carbon ratio of the hydrocarbon. Generally, 3 to 40 $\mu$mole of carbon provided by the organometallic reactant per square meter is sufficient, while 6 to 20 $\mu$mole of carbon per square meter is preferred. At least some organometallic reactant reacts with the hydroxyls on the inorganic oxide surface to produce hydrophobic particulate inorganic oxide. Following step (A), the aqueous mixture may be milled, e.g., wet milled, to reduce the particle size of the hydrophobic inorganic oxide, before recovery or prior to step B.

In step (B) water-immiscible organic solvent is present at a solvent to inorganic oxide weight ratio greater than 5:1 to effect separation of the hydrophobic particulate inorganic oxide from the aqueous suspension. Alternatively, the hydrophobic inorganic oxide may be recovered from the aqueous suspension by filtration, centrifugation, spray drying or by other separation methods known in the art. In a preferred method, steps (A) and (B) are performed sequentially. However, the water-immiscible organic solvent can be added prior to, simultaneously with, or subsequent to the addition of the organometallic reactant used in step (A) provided that the organometallic reactant does not transfer preferentially to the organic solvent and thereby not react with the inorganic oxide. In the first two circumstances, conversion of the hydrophilic particulate inorganic oxide to hydrophobic particulate inorganic oxide is accompanied by a phase separation in which the hydrophobic particulate inorganic oxide separates into the solvent phase.

For purposes of this invention, any organic solvent immiscible with water can be employed in step (B). Suitable water-immiscible organic solvents include low molecular weight siloxanes such as hexamethyldisiloxane, octamethylcyclotetrasiloxane, diphenyltetramethyldisiloxane, and trimethylsiloxy end blocked polydimethylsiloxane fluids. When a siloxane is employed as a solvent, it may serve both as a solvent and as a reactant with the particulate inorganic oxide. Other suitable water-immiscible organic solvents include, but are not limited to, aromatic hydrocarbons such as toluene and xylene; aliphatic hydrocarbons such as hexanes and heptane; cycloalkanes such as cyclohexane; ethers such as diethyl ether and dibutyl ether; tetrahydrofuran; halohydrocarbons such as methylene chloride, chloroform, ethylene chloride, and chlorobenzene; and ketones such as methyl isobutyl ketone.

The water-immiscible organic solvent is employed to provide a water-immiscible organic solvent to inorganic oxide weight ratio greater than 5:1. At water-immiscible organic solvent to inorganic oxide weight ratios less than about 5:1 the hydrophobic particulate inorganic oxide often tends to flocculate in the water-immiscible organic solvent and not form a true precipitate. At water-immiscible organic solvent to inorganic oxide weight ratios greater than 5:1 the hydrophobic particulate inorganic oxide precipitates into the water-immiscible organic solvent phase thereby effecting separation from the aqueous suspension. The upper limit for the amount of water-immiscible solvent added to the method is limited only by economic considerations such as solvent cost, solvent recovery or disposal expense, and equipment capacity. Often the weight ratio of water-immiscible organic solvent to inorganic oxide is greater than 6:1. Preferably the weight ratio of water-immiscible organic solvent to inorganic oxide is within a range of from 6:1 to 10:1.

It is preferred that the water-immiscible organic solvent have a boiling point below about 250° C. to facilitate its removal from the hydrophobic particulate inorganic oxide. However, the boiling point of the water-immiscible organic solvent is not critical since the solvent may be removed from the hydrophobic particulate inorganic oxide by filtration, centrifugation, or other suitable liquid-solid separation means.

In step (B), the water-immiscible organic solvent effects separation of the hydrophobic particulate inorganic oxide from the aqueous suspension into the water-immiscible organic solvent. The hydrophobic product may be washed and/or neutralized to reduce contaminants and produce a product having a pH of 3 or more. The resulting organic slurry of the hydrophobic inorganic oxide may be milled, e.g., wet milled, to reduce the particle size of the particulates prior to separation or use in the form of an organic slurry. The hydrophobic particulate inorganic oxide may be recovered from the water-immiscible organic solvent, dried, and further treated by such methods as heating.

In a further embodiment of the present invention, there is contemplated a cured rubber composition comprising from 10 to 150 parts of hydrophobic inorganic oxide per hundred parts of rubber by weight, wherein the composition is characterized by an M1 White Area of less than 0.4 percent, e.g., M1 White Areas of levels hereinbefore described. As used herein the term "rubber" includes organic rubbers and silicone rubbers. In addition, the hydrophobic particulate inorganic oxides of the present invention may be dispersed in polymeric materials, e.g., plastics and resins.

In a still further embodiment, the M1 White Area is a characteristic of the polymer composition, i.e., the hydrophobic inorganic oxide and the polymer, itself. Consequently, the M1 White Area determination is made according to the method for determining the M1 Standard White Area except that the polymer composite tested need not be the standard formulation; in other words, the determination begins at the subheading entitled *"Microtomy Protocol"*.

The cured rubber composition of the present invention has high strength, as evidenced by a high 300% modulus.

The cured rubber composition can comprise from 10 to 150 parts of hydrophobic particulate inorganic oxide per hundred parts of rubber by weight. More particularly, the cured rubber composition comprises from 20 to 130 parts, preferably, the cured rubber composition comprises from 30 to 100 parts of hydrophobic particulate inorganic oxide per hundred parts of rubber.

Hydrophobic particulate inorganic oxides characterized by low M1 Standard White Areas may be highly dispersed in many cured organic rubber compositions. The rubber may be an organic rubber (natural or synthetic), or it may be a silicone rubber. A wide variety of organic rubbers and mixtures thereof are suitable for use in the cured organic rubber composition of the present invention. Examples of such organic rubbers include, but are not limited to, natural rubber; cis-1,4-polyisoprene; cis-1,4-polybutadiene; trans-1,4-polybutadiene; 1,2-polybutadiene; styrene-butadiene copolymer rubber composed of various percentages of styrene and butadiene and employing the various isomers of butadiene as desired (hereinafter "SBR") styrene-isoprene-butadiene terpolymer rubber composed of various percentages of styrene, isoprene, and butadiene and the various isomers of butadiene as desired (hereinafter "SIBR"); acrylonitrile-based rubber compositions; isobutylene-based rubber compositions; and ethylene-propylene-diene terpolymers; or mixtures of such rubbers, as described in, for example, U.S. Pat. Nos. 4,530,959; 4,616,065; 4,748,199; 4,866,131; 4,894,420; 4,925,894, 5,082,901; and 5,162,409.

Other suitable organic polymers are copolymers of ethylene with other high alpha olefins such as propylene, butene-1 and pentene-1 and a diene monomer. The organic polymers may be block, random, or sequential and may be prepared by emulsion (e.g. e-SBR) or solution polymerization processes (e.g. s-SBR). Additional polymers which may be used include those which are partially or fully functionalized including coupled or star-branched polymers. Additional specific examples of functionalized organic rubbers include polychloroprene, chlorobutyl and bromobutyl rubber as well as brominated isobutylene-co-paramethylstyrene rubber. The preferred organic rubbers are polybutadiene, s-SBR and mixtures thereof.

The amount of organic rubber present in the cured organic rubber composition may vary widely. In most instances, organic rubber constitutes from 20 to 83.3 percent by weight of the cured organic rubber composition. More particularly, organic rubber constitutes from 20 to 80 percent by weight, e.g., from 30 to 75 percent by weight, preferably, from 35 to 70 percent by weight of the cured organic rubber composition. The proportion of organic rubber used in preparing the uncured organic rubber composition is substantially the same as that present in the cured organic rubber composition.

There are many other materials which are customarily and/or optionally present in the cured organic rubber compositions of the present invention. These include, but are not limited to, such materials as vulcanizing agent(s) (usually, but not necessarily, sulfur), accelerator(s), coupling agent(s), lubricant(s), waxes, processing oils, antioxidants, reinforcing carbon blacks, semi-reinforcing carbon blacks, non-reinforcing carbon blacks, other pigments, stearic acid, and/or zinc oxide. The listing of such materials is by no means exhaustive. These and other ingredients may be employed in their customary amounts for their customary purposes so long as they do not seriously interfere with good cured organic rubber formulating practice.

The curable organic rubber composition may be formed from its components in any manner known to the art. Mixing and milling are most commonly used. The curable organic rubber composition may then be molded and cured to form a cured organic rubber article using any of the general methods and techniques known to the art. For example, a tire may be built, molded, and cured using any of the general methods and techniques known to the art.

Organic polymeric compositions, e.g., plastics and/or resin, to which the hydrophobic inorganic oxide of the present invention can be added include essentially any organic plastic or resin. The hydrophobic inorganic oxide of the present invention can be admixed with the plastic or resin while the physical form of the plastic or resin is in any liquid or compoundable form, such as a solution, suspension, latex, dispersion and the like. Suitable plastics and resins include, by way of example, thermoplastic and thermosetting resins and plastics having elastomeric properties.

The plastics and resins may be alkyd resins, oil modified alkyd resins, unsaturated polyesters, natural oils, (e.g., linseed, tung, soybean), epoxides, nylons, thermoplastic polyester (e.g., polyethyleneterephthalate, polybutyleneterephthalate), thermoplastic polycarbonates, thermoset polycarbonates, polyethylenes, polybutylenes, polystyrenes, polypropylenes, ethylene propylene co- and terpolymers, acrylics (homopolymer and copolymers of acrylic acid, acrylates, methacrylates, acrylamides, their salts, hydrohalides, etc.), phenolic resins, polyalkylene oxides, e.g., polyoxymethylene, (homopolymers and copolymers), polyurethanes, poly(urea urethanes), polysulfones, polysulfide rubbers, nitrocelluloses, vinyl butylenes, vinyls (vinyl chloride, vinylidene chloride and/or vinyl acetate containing polymers), ethyl cellulose, the cellulose acetates and butyrates, viscose rayon, shellac, waxes, ethylene copolymers (e.g., ethylene-vinyl acetate copolymers, ethylene-acrylic acid copolymers, ethylene acrylate copolymers), and the like.

The amount of hydrophobic inorganic oxide that may be used in polymeric compositions may range from 5 up to 70 weight percent, based on the total weight of the polymeric composition. For example, the typical amount of hydrophobic inorganic oxide used in ABS (acrylonitrile-butadienestyrene) copolymer is from 30 to 60 weight percent, acrylonitrile-styrene-acrylate copolymer is 5 to 20 weight percent, aliphatic polyketones is 15 to 30 weight percent, alkyds resins (for paints and inks) is 30 to 60 weight percent, thermoplastic olefins is 10 to 30 weight percent, epoxy resins is 5 to 20 weight percent, ethylene vinylacetate copolymer is up to 60 weight percent, ethylene ethyl acetate copolymer is up to 80 weight percent, liquid crystalline polymers (LCP) is 30 to 70 weight percent, phenolic resins is 30–60 weight percent and in polyethylene the amount is usually greater than 40 weight percent.

Another embodiment of the present invention is a composition comprising: (a) a solution comprising water-immiscible solvent and organic rubber dissolved in the water-immiscible solvent; and (b) particulate inorganic oxide dispersed in the solution; wherein the particulate inorganic oxide prior to dispersal in the solution is any of the hydrophobic particulate inorganic oxides described herein.

The organic rubber dissolved in the water-immiscible solvent can be any of the wide variety of organic rubbers and mixtures thereof which are suitable for use in the cured organic rubber composition of the invention, as discussed and exemplified above. Preferably the organic rubber comprises solution styrene-butadiene rubber, polybutadiene rubber, or a mixture thereof.

The standard protocol to be used for determination of M1 Standard White Area according to the present invention is as follows:

Standard Protocol for Determination of M1 Standard White Area

Masterbatch Preparation Protocol

In a suitable vessel equipped with a stirrer and under a purge of nitrogen, combine a minimum of 120 grams of Solflex® 1216 solution styrene-butadiene rubber (The Goodyear Tire & Rubber Co., Akron, Ohio) in cyclohexane containing 0.365 phr of Irganox® 1520D antioxidant (Ciba Specialty Chemicals Corp., Tarrytown, N.Y.) and stir overnight at 60° C. to completely dissolve the rubber and form a 14 weight percent styrene-butadiene rubber solution, also known as "s-SBR cement".

In similar fashion combine a minimum of 50 grams of Budene® 1207 polybutadiene rubber (The Goodyear Tire & Rubber Co., Akron, Ohio) in cyclohexane containing 0.365 phr of Irganox® 1520D antioxidant and stir overnight at 60° C. to completely dissolve the rubber and form an 11 weight percent polybutadiene rubber solution, also known as "BR cement".

To a stirred portion of the s-SBR cement, form a slurry by adding the hydrophobic particulate inorganic oxide to be characterized in an amount, expressed as phr, which is the product of 30.95 and the skeletal density of the hydrophobic particulate inorganic oxide expressed in units of grams per milliliter. After sufficient mixing to produce uniform consistency, add Sundex® 8125 aromatic processing oil (Sun Company, Inc., Refining and Marketing Division, Philadelphia, Pa.) in an amount equivalent to 30 phr. Feed the resulting slurry by pump to a kettle containing a large excess of hot water and steam-strip the cyclohexane into a recovery chamber and allow masterbatch crumb to collect in the kettle water. Examine the water phase for the presence of residual inorganic oxide. Recover the wet masterbatch crumb by filtration. Pan-dry the recovered wet masterbatch crumb for 4 hours at 75° C. in a laboratory oven to produce dry first masterbatch crumb. Analyze the resulting dry first masterbatch crumb by Thermal Gravimetric Analysis to confirm that the residue at 800° C., which corresponds to the inorganic oxide, is within experimental error of the theoretical value of the weight per cent of hydrophobic particulate inorganic oxide in the composition of rubber, oil, and hydrophobic particulate inorganic oxide, and thereby to also confirm substantially complete transfer of the inorganic oxide to the first masterbatch crumb. The Thermal Gravimetric Analysis is conducted by heating a small sample (typically about 10 mg) at a rate of 10C°/min to 800° C. in a flowing nitrogen atmosphere. Weight loss below 200° C. is considered to be moisture loss. Weight percent residue is calculated from [(sample weight at 200° C.)–(sample weight at 800° C.)]/(sample weight at 200° C.). Incomplete transfer of the hydrophobic particulate inorganic oxide to the first masterbatch crumb constitutes a failure of the M1 Standard White Area test since the measured white area is a function of the volume per cent of inorganic oxide in the final cured rubber compound.

To a stirred portion of the BR cement, form a slurry by adding the hydrophobic particulate inorganic oxide to be characterized in an amount, expressed as phr, which is the product of 30.95 and the skeletal density of the hydrophobic particulate inorganic oxide expressed in units of grams per milliliter. After sufficient mixing to produce uniform consistency, add Sundex® 8125 aromatic processing oil (Sun Company, Inc., Refining and Marketing Division, Philadelphia, Pa.) in an amount equivalent to 30 phr. Feed the resulting slurry by pump to a kettle containing a large excess of hot water and steam-strip the cyclohexane into a recovery chamber and allow masterbatch crumb to collect in the kettle water. Examine the water phase for the presence of residual inorganic oxide. Recover the wet masterbatch crumb by filtration. Pan-dry the recovered wet masterbatch crumb for 4 hours at 75° C. in a laboratory oven to produce dry second masterbatch crumb. Analyze the resulting dry second masterbatch crumb by Thermal Gravimetric Analysis to confirm that the residue at 800° C., which corresponds to the particulate inorganic oxide, is within experimental error of the theoretical value of the weight percent of hydrophobic particulate inorganic oxide in the composition of rubber, oil, and hydrophobic particulate inorganic oxide, and thereby to also confirm substantially complete transfer of the inorganic oxide to the second masterbatch crumb. The Thermal Gravimetric Analysis is conducted as described above. Incomplete transfer of the hydrophobic particulate inorganic oxide to the second masterbatch crumb constitutes a failure of the M1 Standard White Area test since the measured white area is a function of the volume percent of inorganic oxide in the final cured rubber compound.

Mixing Protocol

Use a 310-milliliter C. W. Brabender Prep Mixer® equipped with Banbury style mixing blades, a variable speed drive and a thermal liquid constant temperature circulating unit, or equivalent, for mixing the various ingredients.

Before beginning the first pass, adjust and equilibrate the temperature of the mixing chamber to a starting temperature of 80° C. using the thermal liquid constant temperature circulating unit. Adjust the variable speed drive to provide a rotor speed of 65 rpm. For the first pass, determine the weight of the above dry first masterbatch crumb equal to the sum of 89.9 g (70 phr) of Solflex® 1216 solution styrene-butadiene rubber, 27.0 g (21 phr) of Sundex® 8125 oil, and the weight of hydrophobic particulate inorganic oxide equal to the product of 27.86 and the skeletal density of the hydrophobic particulate inorganic oxide expressed in units of grams per milliliter. Also for the first pass, determine the weight of the above dry second masterbatch crumb equal to the sum of 38.5 g (30 phr) of Budene® 1207 polybutadiene rubber, 11.6 g (9 phr) of Sundex® 8125 oil and the weight of hydrophobic particulate inorganic oxide equal to the product of 11.95 and the skeletal density of the hydrophobic particulate inorganic oxide expressed in units of grams per milliliter. Commence the first pass by adding the determined weights of the above dry first masterbatch crumb and the above dry second masterbatch crumb to the mixer and mixing for 0.5 minute at 65 rpm. At 0.5 minute, raise the ram and sweep. After a further 0.5 minute, add 16.7 g (13 phr) of X50S® 1:1 Si-69 silane coupling agent and N330-HAF carbon black (Degussa Corp., Ridgefield, Park, N.J.; supplier: Struktol Corp. of America, Stow, Ohio). After a further 0.5 minute, raise the ram, sweep and add 3.2 g (2.5 phr) of Kadox® 920C surface treated zinc oxide (Zinc Corporation of America, Monaca, Pa.), 2.6 g (2.0 phr) of Wingstay® 100 mixed diaryl p-phenylenediamines (The Goodyear Tire & Rubber Co., Akron, Ohio; supplier: R. T. Vanderbilt Company, Inc., Norwalk, Conn.), and 1.3 g (1.0 phr) of rubber grade stearic acid (C. P. Hall, Chicago, Ill.);. Mix the stock for an additional 2 minutes to achieve a maximum temperature in the range of from 150° C. to 160° C. and to complete the first pass in the mixer. Depending upon the physical characteristics of the particulate inorganic oxide which served as a starting material for the preparation of the hydrophobic particulate inorganic oxide used to produce the polymer masterbatches, the rotor speed may need to be increased or decreased to achieve a maximum temperature in the foregoing range within the 3.5-minute mixing period.

Dump the stock, measure its temperature with a thermocouple, and weigh it to verify that the temperature is within the specified range and that the total weight is within ±5% of the theoretical weight. Sheet the stock off from a two-roll rubber mill and cut it into strips in preparation for a second pass in the mixer. Allow approximately one hour between the completion of the first pass in the mixer and the beginning of the second pass.

Before beginning the second pass, adjust and equilibrate the temperature of the mixing chamber to a starting temperature of 60° C. using the thermal liquid constant temperature circulating unit. Adjust the variable speed drive to provide a rotor speed of 40 rpm. Commence the second pass by adding the strips of first pass stock to the mixer. Immediately thereafter add 2.6 g (2.0 phr) Santoflex® 13 N-(1, 3-dimethylbutyl)-N'-phenyl-p-phenylenediamine (Monsanto, St. Louis, Mo.), 1.9 g (1.5 phr) Okerin® 7240 microcrystalline wax/paraffin wax blend (Astor Corporation, Norcross, Ga.), 1.8 g (1.4 phr) rubber makers sulfur (Taber, Inc., Barrington, R.I.), 2.2 g (1.7 phr) Santocure® NS N-tert-butyl-2-benzothiazole sulfenamide (Monsanto, St. Louis, Mo.), and 2.6 g (2.0 phr) DPG diphenylguanidine (Monsanto, St. Louis, Mo.). After 0.5 minute, raise the ram and sweep. Varying rotor speed if necessary, mix the stock for an additional 1.5 minute to achieve a temperature of from 100° C. to 110° C. and to complete the second pass in the mixer.

Milling Protocol

Preheat a 2-roll rubber mill to approximately 60° C. With the nip setting at 6.35 mm (0.25 inch) and while the mill is running, feed the stock from the second pass into the mill. Adjust the rolling bank if necessary to maintain uniform thickness. Perform eight side cuts, then eight end passes.

Adjust the nip setting to produce a sheet thickness of 2.032 mm±0.127 mm (0.080 inch±0.005 inch). Sheet the stock off the mill and lay it flat on a clean surface.

Using a stencil, cut a rectangular sample 101.6 mm×76.2 mm (4 inches×3 inches) from the stock and then store the sample between clean polyethylene sheets. Condition overnight at a temperature of 23° C.±2° C. and a relative humidity of 50%±5%.

Curing Protocol

Place the conditioned sample in a 101.6 mm×76.2 mm×1.524 mm (4 inch×3 inch×0.06 inch) standard frame machine steel mold plate compression mold having a coating of Teflon® polytetrafluoroethylene (E. I. duPont de Nemours & Co., Wilmington, Del.) from 0.0254 mm to 0.0508 mm (0.001 to 0.002 inch) thick, or equivalent, and cure in a 61 centimeter×61 centimeter (24 inch×24 inch) 890 kilonewton (100 ton) 4-post electrically heated compression press, or equivalent, for 20 minutes at 150° C. under a pressure of 13.79 megapascals (2000 pounds per square inch). Remove the resulting cured rubber sheet from the mold and allow it to rest overnight.

Microtomy Protocol

Use an RMC MT-6000-XL microtome equipped with a CR2000 cryogenic accessory (RMC Inc., Tucson, Ariz.) and a Micro Star LH grade, black, standard boat style diamond knife (Micro Star Technologies, Huntsville, Tex.), or equivalent, for microtoming. Mount a diamond cutting edge 6 to 10 mm long cut at an included angle of 45 degrees in the microtome cryo knife holder and set the microtome clearance angle to 4 degrees as specified on the bottom of the knife as received.

Set the initial specimen and diamond knife temperatures identically in the range of from −70° C. to −40° C. Subsequent individual temperature adjustments may be necessary to obtain optimal cutting conditions.

Cut a rough sample about 15 mm×about 15 mm×about 1.5 mm from the cured rubber sheet. Place this rough sample in the stainless steel RMC Torme flat specimen holder of the microtome and securely tighten the sample down with an Allen wrench supplied with the microtome. Using the specimen trimming block supplied with the microtome, the Torme holder, and a razor blade, trim the specimen so that about 4 mm of the specimen protrudes from the face of the holder and trim the corners from the specimen at 45° so that the block face for microtoming is about 8 mm long.

Position the holder in the cryo unit arm of the advance mechanism of the microtome so that the length of the block face is vertical. Cool to the specimen temperature set earlier. Manually plane the block face using a dulled edge region of the diamond knife to create a smooth flat surface on the block face. Move the knife edge to a clean sharp region of the diamond knife edge and plane a few thin sections from the block face. Set the cutting stroke to 0.5 mm per second and either manually or automatically advance the block face to cut sections approximately 2 micrometers ($\mu$m) in thickness on the clean sharp area of the diamond knife edge or by moving over to a new area of the same knife.

Secure each section, as it first breaks over the edge of the diamond knife with a pair of pre-cooled biological-grade number 5 fine tipped normally open or normally self-closing straight tweezers (A. Dumont & Fils, Switzerland; Structure Probe Inc., West Chester, Pa.), or equivalent. Hold each section at its corner as it starts to come off and gently pull the section away from the knife edge without breaking, cracking or stretching it throughout the cutting stroke to minimize the possibility of the section rolling up or compressing excessively against the edge of the knife. Cut the sections dry; do not use dimethylsulfoxide or xylenes to aid in cutting. At the end of the cutting stroke, draw the intact section gently with the tweezers onto a cryo-cooled Fisherbrand® Superfrost® Plus glass microscope slide, size 25 mm×75 mm×1 mm, (Fisher Scientific Co., Pittsburgh, Pa.), or equivalent. The slide, which has previously been cleaned with optical lens tissue or equivalent, rests on the top of a custom cut U-shaped silicone rubber spacer that surrounds the knife boat on two sides and its back surface. Place from eight to ten thin sections from a sample onto each glass slide and position them for convenient preparation during optical mounting. Remove the slide from the cryo chamber, place it in a microscope slide box to avoid excessive moisture contamination, and allow it to warm to room temperature.

Section Preparation Protocol

Coat the thin sections residing on the microscope slide with Cargille Series A $n_D=1.550\pm0.0002$ immersion oil (R. P. Cargille Laboratories, Inc., Cedar Grove, N.J.), or equivalent. Tease the thin sections carefully using tweezers and/or pointed probes on the stage of a Nikon SMZ-UZoom 1:10 Stereo Microscope, or equivalent, equipped with A Nikon SMZ-U UW 10×A/24 binocular eyepiece assembly (Nikon Corporation, Tokyo, Japan), or equivalent, at low magnification to remove folds, wrinkles and pleats, and to straighten the sections. Care must be taken not to tear the delicate thin sections during this manipulation process. Align the straightened thin sections parallel to one another in groups of one to five (preferably four) for optimum spatial placement under an 18 mm diameter circular cover glass. Clean an 18 mm diameter, 0.13 mm to 0.17 mm thick circular microscope cover glass, (Fisher Scientific Co., Pittsburgh, Pa.), or equivalent, with optical lens tissue or equivalent, and place it on a group of aligned sections. Two or three groups of sections can be accommodated on a microscope slide, if necessary. Fold a Scotties® two-ply 23.3 cm×18.2 cm (9.2 inch×7.2 inch) facial tissue (Scott Paper Company, Philadelphia, Pa.), or equivalent, into the approximate size of a slide for use as a blotter. Place the blotter over the cover glass protected sections on the microscope slide and apply a flat plate or microscope slide box over the blotter. Manually apply a firm, gentle, uniformly steady, downward force to the plate or slide box and maintain the force for approximately 15 seconds. Remove the flat plate or slide box and the blotter. Repeat the blotting procedure using a fresh surface of Scotties tissue or equivalent, but use less force.

Equipment and Software Selection Protocol

Use the following equipment or equivalent for field selection: a Nikon Microphot FXA research optical microscope equipped with a phase contrast objective module fitted with a plan 20×/0.05 Ph2 phase objective, a Ph2 phase condenser lens (Nikon Corporation, Tokyo, Japan), a system magnification of 1.25×, and an intermediate lens magnification of 1.25×; a Sony Trinitron PVM 1343MD Color Video Monitor (Sony Corporation, Tokyo, Japan), and a Sony CCD three-chip DXC-760MD Camera (Sony Corporation, Tokyo, Japan); a MacIntosh® IIfx Computer with a Color SuperMac® 43 cm (17 inch) monitor (Apple Corporation, Cupertino, Calif.) and a Data Translations frame store card (Data Translations, Raleigh, N.C.). Use the following software or equivalent for capturing images and image analysis: ColorKit™ software (Data Translations, Raleigh, N.C.), NIH Image software (National Institute of Health, Washington, D.C.), and Microsoft® Excel® software (Microsoft Corporation, Redmond, Wash.).

Field Selection Protocol

At approximately 250× magnification, visually scan the microtomed sections each having a thickness in the range of from about 2 to about 3 $\mu$m that have been prepared for phase contrast optical microscopic examination to eliminate from further consideration sections which contain major anomalies such as wrinkles, folds, waves, tears, and/or dirt particle populations. Scan across at least two of the sections remaining under consideration to determine regions representative of the entire sample. Examine these same regions under approximately 500× magnification and choose fields using blind longitudinal traverses and blind cross traverses of the microscope stage on each section. Use only fields exhibiting low relief (accuracy of white area measurement is enhanced by accepting only substantially flat fields; fields exhibiting variable high relief result in blurred, out of focus images due to the low depth of field which is characteristic of the optical microscope). From at least two sections, capture a total of ten field images at least one image as a PICT formatted files using the Colorkit® software. Save the PICT files to optical disk for computer assisted white area measurement

Image Analysis

Video-micrograph files saved as PICT files may be opened directly using the NIH Image software.

Upon opening a PICT file, an image appears as a raster of 640 pixels×480 pixels on the monitor at a scale of 2.00±0.06 linear pixels per micrometer of object distance. The actual value of the scale can be ascertained by projecting horizontally on the monitor an image of a stage micrometer having 10 $\mu$m per division, and measuring a distance of 250 $\mu$m or greater on the displayed image. Enter the actual distance marked into the software and allow the computer to calibrate the scale, also known as a calibration factor, in units of linear pixels/$\mu$m.

Analyze each selected field image individually. Smooth the image to remove background noise. Threshold and edit the image manually to identify the white areas to be counted and to remove artifacts. Convert the edited image to a binary image and save the binary image as a file.

From the Options menu, choose the area parameter and set the minimum number of pixels to be counted at 4.

Analyze each binary image to produce a list of numbers, where each number is the area of an individual white area feature, and save the list. Use the Microsoft® Excel® software to sum the numbers of the list to produce a total white area for the field.

Find the percent white area for a field by dividing the total white area by the total area for one field and multiplying the quotient by one hundred. Find the M1 Standard White Area by taking the average of the white areas of the ten fields captured. Save all files to optical disk. This concludes the Standard Protocol for Determination of M1 Standard White Area.

The invention is further described in conjunction with the following example which is to be considered illustrative rather than limiting, and in which all parts are parts by weight and all percentages are percentages by weight unless otherwise specified. Other than in the operating examples, or where otherwise indicated, all numbers expressing quantities, ratios, ranges, etc. used herein are to be understood as modified in all instances by the term "about".

In the following example, moisture (or volatiles) content was determined by using a COMPUTRAC Moisture Analyzer Model MA-5A. The silica sample was heated to 165° C. and held at this temperature until the sample weight no longer changed. Weight percent moisture (or volatiles) content was calculated as [(original sample weight)−(sample weight after heating)]/(original sample weight)]. Weight percent solids content was calculated as [100−weight percent moisture (or volatiles)].

EXAMPLE

A hydrophilic particulate amorphous precipitated silica was produced by acidifying a sodium silicate solution with sulfuric acid, The majority of the precipitate was formed at a pH above 8.5. Continuation of the acid addition until the pH of the liquid reached a level of from 3.3 to 4.0 completed the precipitation. The resulting first aqueous suspension was filtered and the filter cake was washed until the rinse water demonstrated a conductivity in the range of from 300 to 800 micromhos. A portion of this washed filter cake was re-liquified using a high shear agitator to form a second aqueous suspension of hydrophilic amorphous precipitated silica, which suspension contained 12.6 percent solids by weight. A centrifugal disk atomizer was used to spray dry this second aqueous suspension to 5.7 percent moisture by weight to form a hydrophilic amorphous precipitated silica powder. The powder had a BET surface area of 159 m$^2$/g.

Another portion of the above washed filter cake was re-liquified with a high shear agitator to form a third aqueous suspension of hydrophilic particulate amorphous precipitated silica, which suspension contained 10 percent solids by weight. Sixteen kilograms of the third aqueous suspension was added to a suitable vessel and stirred. Isopropanol (8 kg) and hexamethyldisiloxane (0.368 kg) were sequentially added to the stirred suspension. The pH of the resulting reaction mixture was adjusted to 0.5 by adding 96 weight percent sulfuric acid. The reaction mixture was heated to 73° C. and held at this temperature for 2.2 hours. After cooling the reaction mixture to below 60° C., cyclohexane (8 kg) was added. The reaction mixture was then agitated briefly to evoke a phase transfer of hydrophobic particulate amorphous precipitated silica into the cyclohexane phase without causing an emulsion to form. The aqueous phase was removed.

The organic phase containing the hydrophobic precipitated silica was washed with dilute aqueous NaOH several times until the washwater had a pH of 5.11. The slurry of hydrophobic particulate amorphous precipitated silica in cyclohexane was thinned with additional cyclohexane (3.4 kg) and the slurry was drained from the vessel. The vessel was rinsed with cyclohexane (1.75 kg) to remove any remaining slurry, and the rinse was combined with the drained slurry. The slurry was filtered and the solids were washed with cyclohexane. The washed material was placed in a shallow pan and dried in an oven at 85° C. until the level of residual volatiles dropped to about 5%. The resulting product was hydrophobic particulate amorphous precipitated silica which was characterized by a BET surface area of 128 m$^2$/g, a silanol content of 11.9 OH/nm$^2$, a carbon content of 1.43 percent by weight, and a pH of 3.4.

The hydrophobic particulate amorphous precipitated silica of the Example was tested for methanol wettability by adding 15 mL of a 50 weight percent mixture of methanol (HPLC grade) and deionized water to a 50 milliliter (mL) conical centrifuge tube containing 2.0 grams of the material. The centrifuge tube was graduated in 0.5 mL marks up to the 10 mL level and in 1.0 mL marks from the 10 to 50 mL levels. The contents of the tube were shaken for 15 seconds and centrifuged at approximately 4,000 revolutions per minute (rpm) in a hanging bucket type centrifuge at room temperature (23–25° C.) for 15 minutes. The centrifuge tube was removed and handled carefully to avoid resuspending the sediment. All of hydrophobic silica was wetted, i.e., formed the sediment, resulting in a sediment volume of 14 mL.

The three different concentrations of the methanol/water mixtures listed in Table 1 were used in the aforedescribed procedure to determine the amount of methanol necessary to wet 50 percent volume of the hydrophobic silica of the Example. Two different batches of the Example identified as A and B were tested. The percent volume of hydrophobic silica wetted by the different concentrations of methanol was calculated by dividing the volume of the partially wetted hydrophobic silica by the volume of the completely wetted hydrophobic silica and multiplying by 100. These results were plotted on a graph of Percent Volume Wetted Silica versus Weight Percent of Methanol and fitted with a straight line. The concentration of methanol at which 50 percent volume of the hydrophobic silica was wetted for Examples A and B was calculated from the line equations and the average was 31 percent.

TABLE 1

| Weight Percent Methanol | Sample A Percent Wetted | Sample B Percent Wetted |
| --- | --- | --- |
| 26.2 | 5 | 2 |
| 31.8 | 53 | 50 |
| 35.2 | 87 | 93 |

The percent carbon of a sample of the hydrophobic inorganic oxide of the Example was tested in triplicate using the procedure described herein. The average was 1.32 weight percent carbon before extraction. Another sample of the Example material was extracted using the Soxhlet extraction procedure described herein. The percent carbon analysis was done in triplicate and the average was 1.41 weight percent after extraction. The percent carbon extracted was little to none and within experimental error. The percent carbon extracted is typically was calculated using the following formula.

$$\frac{(\% \text{ carbon before extraction}) - (\% \text{ carbon after extraction})}{(\% \text{ carbon before extraction})} \times 100$$

The hydrophobic particulate amorphous precipitated silica was tested for M1 Standard White Area. The white areas of the ten fields, the M1 Standard White Area (i.e., the mean), and the Standard Deviation are shown in Table 2:

TABLE 2

| | |
| --- | --- |
| White Area, % (Ten Fields) | 0.02 |
| | 0.02 |
| | 0.03 |
| | 0.02 |
| | 0.02 |
| | 0.12 |
| | 0.02 |
| | 0.02 |
| | 0.01 |
| | 0.04 |
| M1 Standard White Area, % | 0.03 |
| Standard Deviation | 0.03 |

A portion of the stock, which was sheeted off the mill and laid flat on a clean surface in the course of conducting the M1 Standard White Area protocol, was used to prepare specimens for other physical testing. Thin specimens for stress-strain and dynamic properties and thick specimens for hardness and rebound testing were prepared from this uncured rubber stock. Thin specimens were cured at 150° C. for 20 minutes while thick specimens were cured at 150° C. for 30 minutes. The difference in cure times was to accommodate for differences in mold lag time.

The cure behavior and cured properties of this composition are as shown in Table 3.

TABLE 3

| Cure Behavior and Cured Properties | |
|---|---|
| Rheometer (150° C.) | |
| Maximum Torque, dNm | 30.6 |
| Minimum Torque, dNm | 3.3 |
| Delta Torque | 27.3 |
| $T_{50}$, min. | 5.8 |
| Stress/Strain | |
| Tensile Strength, MPa | 19.6 |
| Elongation at Break, % | 635 |
| 100% Modulus, MPa | 2.5 |
| 300% Modulus | 8.3 |
| Hardness | |
| Shore A, 23° C. | 70 |
| Shore A, 100° C. | 68 |
| Rebound | |
| 100° C., % | 66.0 |
| Dynamic Properties (1 Hz, 2.0% Strain) | |
| G' at 60° C., MPa | 3.73 |
| Tan Delta at 60° C. | 0.127 |
| Tan Delta at 0° C. | 0.202 |
| Degree of Dispersion | |
| M1 White Area, area % | 0.03 |

Inasmuch as the rubber formulation employed in this Example was the same as that prescribed in the Standard Protocol for Determination of M1 Standard White Area, the M1 White Area of the cured rubber composition was the same as the M1 Standard White Area of the hydrophobic amorphous precipitated silica used in producing the cured rubber composition. The M1 White Area value of 0.03% is indicative of very high dispersion of the amorphous precipitated silica in the cured rubber composition.

Although the present invention has been described with references to specific details of certain embodiments thereof, it is not intended that such details should be regarded as limitations upon the scope of the invention except in so far as they are included in the accompanying claims.

We claim:

1. In the method of producing a hydrophobic particulate inorganic oxide by contacting an acidic aqueous suspension of a particulate inorganic oxide selected from the group consisting of precipitated silica, colloidal silica and mixtures of such inorganic oxides, with an organometallic compound to form an acidic aqueous suspension of hydrophobic particulate inorganic oxide, optionally in the presence of a surfactant and/or a water miscible solvent, and recovering said hydrophobic particulate inorganic oxide, the improvement comprises using said organometallic compound in an amount sufficient to hydrophobize the inorganic oxide, such that the inorganic oxide has a hydroxyl content of from 2 to 15 $OH/nm^2$, a carbon content of from 0.1 to 6 weight percent, and a methanol wettability of from 15 to 45 percent, in an aqueous suspension of inorganic oxide having a pH of 2.5 or less, and treating the acidic aqueous suspension of the hydrophobic particulate inorganic oxide with acid neutralizing agents to produce a hydrophobic particulate inorganic oxide having a pH of from 3 to 10, a carbon content that is substantially non-extractable and an M1 Standard White Area of less than 0.4 percent.

2. The method of claim 1 wherein the organometallic material is selected from the group consisting of first organometallic compound represented by the following formula:

$$R^1_a MX_{4-a}$$

second organometallic compound represented by the formula:

$$R^2_{2n+2} Si_n O_{n-1}$$

third organometallic compound represented by the formula:

$$(R^3_3 Si)_k NR^5_{-k}$$

and fourth organometallic compound represented by the formula:

$$R^4_{2m} Si_m O_m$$

wherein: (a) each M is independently silicon, titanium or zirconium; (b) each $R^1$ is independently a hydrocarbon group having no ethylenic unsaturation and containing from 1 to 18 carbon atoms; (c) each X is independently halo, amino, alkoxy containing from 1 to 12 carbon atoms, or acyloxy containing from 1 to 12 carbon atoms; (d) a is 1, 2, or 3; (e) each $R^2$ is independently halo, hydroxy, or a hydrocarbon group having no ethylenic unsaturation and containing from 1 to 18 carbon atoms with the proviso that at least 50 mole percent of the $R^2$ substituents are said hydrocarbon groups; (f) n is from 2 to 10,000; (g) each $R^3$ is independently halo, hydroxy, or a hydrocarbon group having no ethylenic unsaturation and containing from 1 to 18 carbon atoms, with the proviso that at least 50 mole percent of the $R^3$ substituents are said hydrocarbon groups; (h) each $R^5$ is independently hydrogen or a hydrocarbon group having no ethylenic unsaturation and containing from 1 to 18 carbon atoms; (i) k is 1 or 2; (j) each $R^4$ is independently a hydrocarbon group having no ethylenic unsaturation and containing from 1 to 18 carbon atoms; and (k) m is from 3 to 20.

3. The method of claim 2 wherein M is silicon and X is alkoxy having from 1 to 4 carbon atoms or halo.

4. The method of claim 3 wherein X is chloro or methoxy.

5. The method of claim 1 wherein the inorganic oxide is precipitated silica.

6. The method of claim 5 wherein the hydrophobized silica has a hydroxyl content of from 4–12 $OH/nm^2$, a carbon content of from 0.3 to 3 weight percent and an M1 Standard White Area of less than 0.25 percent.

7. The method of claim 6 wherein the amount of organometallic compound used provides from 3 to 40 μmole of carbon per square meter of silica.

8. The method of claim 7 wherein the organometallic compound is hexamethyl disiloxane.

9. The method of claim 6 wherein the organometallic compound is selected from those represented by the formula $$R^1_a MX_{4-a}$$

wherein each $R^1$ is a hydrocarbon group having no ethylenic unsaturation and containing from 1 to 8 carbon atoms, X is halo or an alkoxy group containing from 1 to 12 carbon atoms and a is 1, 2, or 3.

10. The method of claim 1 wherein recovering the hydrophobic particulate inorganic oxide is done by mixing a water-immiscible organic solvent with the aqueous suspension of the hydrophobic particulate inorganic oxide, the weight ratio of solvent to inorganic oxide being greater than 5:1, thereby to transfer the hydrophoblized inorganic oxide from the aqueous phase of the mixture into the organic solvent phase.

11. The method of claim 10 wherein the water-immiscible organic solvent is selected from the group consisting of aliphatic hydrocarbons, cycloalkanes, aromatic hydrocarbons and ketones.

12. The method of claim 11 wherein the water-immiscible solvent is selected from hexanes, heptane, toluene, cyclohexane and methyl isobutyl ketone.

13. The method of claim 10 wherein the aqueous suspension of hydrophobic particulate inorganic oxide is wet milled prior to mixing with water-immiscible organic solvent.

14. The method of claim 10 wherein the organic solvent phase that contains the hydrophobic particulate inorganic oxide is wet milled.

15. The method of claim 1 wherein a water-miscible organic co-solvent is present.

16. The method of claim 15 wherein the water-miscible co-solvent is selected from tetrahydrofuran and $C_1$–$C_4$ alkanols.

17. The method of claim 1 wherein the aqueous suspension of particulate inorganic oxide is wet milled prior to its being contacted with the organometallic compound.

* * * * *